(12) United States Patent
Murdoch

(10) Patent No.: US 8,031,049 B2
(45) Date of Patent: Oct. 4, 2011

(54) METHOD OF COMMUNICATING A COMMAND FOR LOAD SHEDDING OF A LOAD CONTROL SYSTEM

(75) Inventor: John Bruce Murdoch, Wind Gap, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 12/783,132

(22) Filed: May 19, 2010

(65) Prior Publication Data
US 2010/0225452 A1 Sep. 9, 2010

Related U.S. Application Data

(62) Division of application No. 11/938,604, filed on Nov. 12, 2007, now Pat. No. 7,747,357.

(60) Provisional application No. 60/858,524, filed on Nov. 13, 2006.

(51) Int. Cl.
 G08B 5/22 (2006.01)
 H04Q 1/30 (2006.01)
 G08B 1/08 (2006.01)
 G08B 23/00 (2006.01)

(52) U.S. Cl. .............. 340/7.36; 340/7.37; 340/539.3; 340/693.1; 340/693.3; 700/291; 700/297

(58) Field of Classification Search ........ 340/7.36–7.37, 340/539.3, 693.1, 693.3; 700/286–287, 291, 700/295–297; 709/203
See application file for complete search history.

(56) References Cited

U.S. PATENT DOCUMENTS

| | | | |
|---|---|---|---|
| 4,692,761 A * | 9/1987 | Robinton ............... 370/448 |
| 5,099,348 A * | 3/1992 | Huddleston et al. ......... 398/107 |
| 5,572,438 A | 11/1996 | Ehlers et al. |
| 5,812,422 A | 9/1998 | Lyons |
| 6,225,760 B1 | 5/2001 | Moan |
| 6,388,399 B1 | 5/2002 | Eckel et al. |
| 6,392,368 B1 | 5/2002 | Deller et al. |
| 6,487,457 B1 | 11/2002 | Hull et al. |
| 6,519,509 B1 | 2/2003 | Nierlich et al. |
| 6,553,422 B1 | 4/2003 | Nelson |
| 6,674,248 B2 | 1/2004 | Newman, Jr. et al. |
| 6,771,029 B2 | 8/2004 | Ribarich et al. |
| 6,842,668 B2 * | 1/2005 | Carson et al. ............... 700/286 |
| 6,938,088 B1 | 8/2005 | Hericourt |
| 6,983,783 B2 | 1/2006 | Carmen, Jr. et al. |

(Continued)

FOREIGN PATENT DOCUMENTS

EP 1 245 453 10/2002

(Continued)

Primary Examiner — Ramesh Patel
(74) Attorney, Agent, or Firm — Ostrolenk Faber LLP

(57) ABSTRACT

The present invention provides a means for secure communication between an electrical utility company and an electricity customer, such that the customer is able to shed one or more loads in response to a load shed command from the utility company. A system server of the customer periodically connects to a utility server of the utility company using a standard computer protocol, such as Hypertext Transfer Protocol (HTTP). The system server sends a request message via the Internet to the utility server. The request message provides data on the total possible load, the present power consumption, and the present load shed state of the electricity customer. The utility server receives the request message and responds to the request message by transmitting to the system server a response message, which includes a load shed command.

9 Claims, 10 Drawing Sheets

U.S. PATENT DOCUMENTS

| | | |
|---|---|---|
| 7,211,968 B2 | 5/2007 | Adamson et al. |
| 7,248,589 B2 | 7/2007 | Banerjee et al. |
| 7,248,978 B2 * | 7/2007 | Ransom .................. 702/62 |
| 7,309,965 B2 | 12/2007 | Dowling et al. |
| 7,313,618 B2 | 12/2007 | Braemer et al. |
| 7,346,016 B2 | 3/2008 | Nielsen et al. |
| 7,394,451 B1 | 7/2008 | Patten et al. |
| 7,417,557 B2 * | 8/2008 | Osterloh et al. ......... 340/870.03 |
| 7,461,150 B1 | 12/2008 | Boulia |
| 2002/0047628 A1 | 4/2002 | Morgan et al. |
| 2003/0057886 A1 | 3/2003 | Lys et al. |
| 2003/0197426 A1 * | 10/2003 | Carson et al. .................... 307/40 |
| 2004/0002792 A1 | 1/2004 | Hoffknecht |
| 2004/0117330 A1 * | 6/2004 | Ehlers et al. .................. 705/412 |
| 2005/0138432 A1 * | 6/2005 | Ransom et al. ............... 713/201 |
| 2007/0061050 A1 | 3/2007 | Hoffknecht |
| 2008/0177678 A1 | 7/2008 | Di Martini et al. |
| 2009/0062970 A1 * | 3/2009 | Forbes et al. ................. 700/295 |

FOREIGN PATENT DOCUMENTS

WO    WO 03/077610    9/2003

* cited by examiner

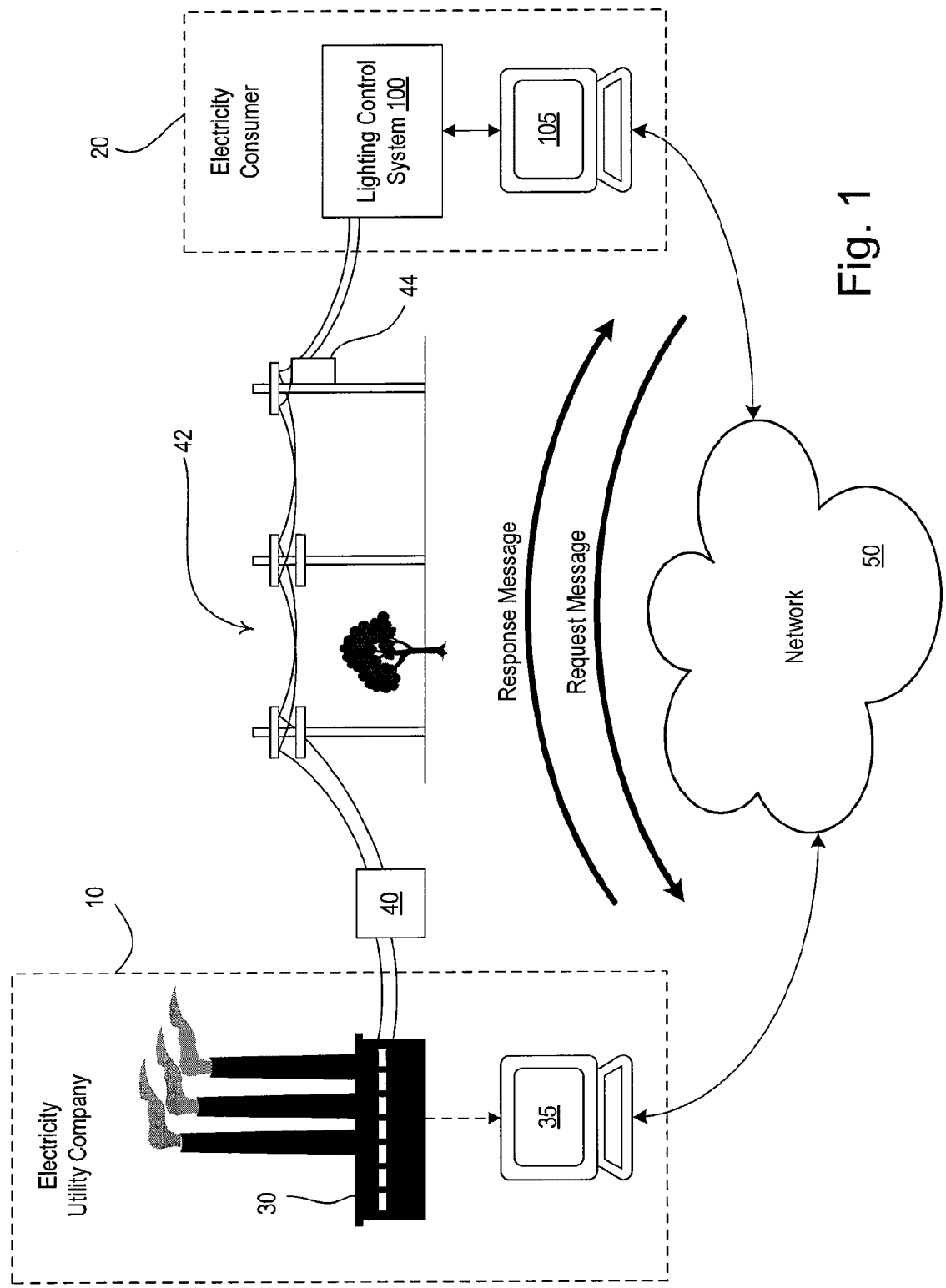

| Intensity Value | Power |
|---|---|
| 0 | P0 |
| 1 | P1 |
| 2 | P2 |
| 3 | P3 |
| 4 | P4 |
| . | . |
| . | . |
| . | . |
| . | . |
| . | . |
| . | . |
| . | . |
| . | . |
| . | . |
| . | . |
| . | . |
| . | . |
| 126 | P126 |
| 127 | P127 |

Fig. 3

METHOD OF COMMUNICATING A COMMAND FOR LOAD SHEDDING OF A LOAD CONTROL SYSTEM

RELATED APPLICATIONS

This application is a divisional of prior application Ser. No. 11/938,604 filed Nov. 12, 2007, by John Bruce Murdoch entitled METHOD OF COMMUNICATING A COMMAND FOR LOAD SHEDDING OF A LOAD CONTROL SYSTEM which claims priority from commonly-assigned U.S. Provisional Application Ser. No. 60/858,524, filed Nov. 13, 2006, entitled METHOD OF LOAD SHEDDING, the entire disclosure of which is hereby incorporated by reference.

BACKGROUND OF THE INVENTION

1. Field of the Invention

The present invention relates to a load control system comprising a plurality of load control devices for controlling the amount of power delivered to a plurality of electrical loads from an AC power source, and more particularly, to a lighting control system for shedding lighting loads in response to a command received via a network, such as the Internet.

2. Description of the Related Art

Reducing the total cost of electrical energy is an important goal for many electricity consumers. The customers of an electrical utility company are typically charged for the total amount of energy consumed during a billing period. However, since the electrical utility company must spend money to ensure that its equipment (e.g., an electrical substation) is able to provide energy in all situations, including peak demand periods, many electrical utility companies charge their electricity consumers at rates that are based on the peak power consumption during the billing period, rather than the average power consumption during the billing period. Thus, if an electricity consumer consumes power at a very high rate for only a short period of time, the electricity consumer will face a significant increase in its total power costs.

Therefore, many electricity consumers use a "load shedding" technique to closely monitor the amount of power presently being consumed by the electrical system. Additionally, the electricity consumers "shed loads", i.e., turn off some electrical loads, if the total power consumption nears a peak power billing threshold set by the electrical utility. Prior art electrical systems of electricity consumers have included power meters that measure the instantaneous total power being consumed by the system. Accordingly, a building manager of such an electrical system is able to visually monitor the total power being consumed. If the total power consumption nears a billing threshold, the building manager is able to turn off electrical loads to reduce the total power consumption of the electrical system.

Many electrical utility companies offer a "demand response" program to help reduce energy costs for their customers. With a demand response program, the electricity consumers agree to shed loads during peak demand periods in exchange for incentives, such as reduced billing rates or other means of compensation. For example, the electricity utility company may request that a participant in the demand response program shed loads during the afternoon hours of the summer months when demand for power is great. Some prior art lighting control systems have offered a load shedding capability in which the intensities of all lighting loads are reduced by a fixed percentage, e.g., by 25%, in response to an input provided to the system. The input may comprise an actuation of a button on a system keypad by a building manager. Such a lighting control system is described in commonly-assigned U.S. Pat. No. 6,225,760, issued May 1, 2001, entitled FLUORESCENT LAMP DIMMER SYSTEM, the entire disclosure of which is hereby incorporated by reference.

Electrical utility companies have sought, for many years, to encourage customers to shed load during periods of peak demand, but have been faced with many challenges. For example, the utility companies have had difficulty successfully communicating a command to shed load to the customers, for example, via radio-frequency (RF) signals or via a modem. Typically, the electrical utility companies do not have a direct means to know if the customer has actually reduced load, and thus, the electrical utility companies have not been able to monitor that the customer has actually shed loads. For example, when a radio signal is sent out, there is no way for the power company to tell if a specific customer has actually changed loads to reduce the power consumption. Further, the electrical utility companies have also had trouble ensuring that the communications with the customer are secure.

The fundamental problem with previous strategies for electronically communicating load shed commands from the electrical utility company to the customers has been that the communications (i.e., RF signals or transmissions via the Internet) with the customer have been initiated at the electrical utility company. In other words, the electrical utility company attempts to send a signal to a device inside the customer's premises to transmit a load shed command. Since the security of computer systems is a major concern of most commercial customers, most customers are wary providing access to their computer systems to outside vendors, such as the electrical utility company. If the electrical utility company can get through the firewall of a customer to turn the lights off, a computer hacker may also be able to get in.

SUMMARY OF THE INVENTION

According to the present invention, a method of communicating a command to control a plurality of electrical loads comprises the steps of: (1) transmitting a command request message; (2) receiving a response message in response to the command request message, the response message including the command; and (3) controlling the plurality of electrical loads in response to the command of the response message. Preferably, the command request message comprises a total amount of power presently being consumed by the plurality of electrical loads, the command of the response message comprises a load shed command, and the method further comprises determining the load shed command in response to the total amount of power presently being consumed by the plurality of electrical loads of the command request message.

The present invention further provides a load control system for controlling a plurality of electrical loads. The load control system is adapted to communicate with an external server, and comprises a plurality of load control devices adapted to control the amount of power delivered to the plurality of electrical loads, and an internal system server operatively coupled to the load control devices for controlling the amount of power delivered to the electrical loads. The internal server is adapted to transmit a command request message to the external server, and receive a response message including a command from the external server in response to the command request message the response message. The internal server is operable to control the amount of power delivered to the electrical loads in response to the command of the response message.

According to another embodiment of the present invention, a server for a load control system for controlling a plurality of electrical loads comprises means for transmitting a command request message, means for receiving a response message including a command in response to the command request message, and means for controlling the plurality of electrical loads in response to the command of the response message.

In addition, the present invention provides a computer-readable medium having stored thereon computer-executable instructions for performing a method of communicating a command to control a plurality of electrical loads. The method comprises the steps of: (1) transmitting a command request message; (2) receiving a response message in response to the command request message, the response message including the command; and (3) controlling the plurality of electrical loads in response to the command of the response message.

According to another embodiment of the present invention, a method of controlling a plurality of load control systems comprises the steps of: (1) receiving a command request message from a first system server of a first load control system; (2) determining a command to control the plurality of electrical loads in response to the command request message; and (3) transmitting a response message to the first system server in response to the command request message, the response message including the command to control a plurality of electrical loads. Preferably, the command request message comprises a total amount of power presently being consumed by the electrical loads of the first load control system, and the command comprises a load shed command. Further, the method preferably comprises the step of determining a total amount of power presently being consumed by a subset of the load control systems including the first load control system.

According to another embodiment of the present invention, a system for controlling the amount of power delivered to a plurality of electrical loads comprises a load control system and a utility server. The load control system includes a system server and a plurality of load control devices for controlling the amount of power delivered to the electrical loads. The utility server is adapted to communicate with the system server via a network, such that the system server may transmit a command request message to the utility server via the network. The utility server is adapted to transmit a response message to the system server in response to the command request message, the response message including a command. The system server is operable to control the amount of power delivered to the electrical loads in response to the command of the response message.

The present invention further provides a utility server for controlling a plurality of load control systems, each comprising a system server operable to control a plurality of electrical loads. The utility server comprises means for receiving a load shed request message from a first system server of a first load control system, where the load shed request message includes a total amount of power presently being consumed by the electrical loads of the first load control system. The utility server further comprises means for determining a total amount of power presently being consumed by a subset of the load control systems including the first load control system, means for determining a load shed command for the plurality of electrical loads in response to the total amount of power presently being consumed by the subset of the load control systems, and means for transmitting a response message including the load shed command to the first system server in response to the load shed request message.

In addition, the present invention provides a computer-readable medium having stored thereon computer-executable instructions for performing a method of controlling a plurality of load control systems, each load control system comprising a system server operable to control a plurality of electrical loads. The method comprising the steps of: (1) receiving a load shed request message from a first system server of a first load control system, the load shed request message including a total amount of power presently being consumed by the electrical loads of the first load control system; (2) determining a total amount of power presently being consumed by a subset of the load control systems including the first load control system; (3) determining a load shed command for the plurality of electrical loads in response to the total amount of power presently being consumed by the subset of the load control systems; and (4) transmitting a response message to the first system server in response to the load shed request message, the response message including the load shed command.

Other features and advantages of the present invention will become apparent from the following description of the invention that refers to the accompanying drawings.

BRIEF DESCRIPTION OF THE DRAWINGS

FIG. 1 is a simplified block diagram of an electrical utility company and an electricity customer according to the present invention;

FIG. 3 is an example of a format of a ballast power consumption table of a system server of the electricity customer of FIG. 1;

DETAILED DESCRIPTION OF THE INVENTION

Figure 2A:
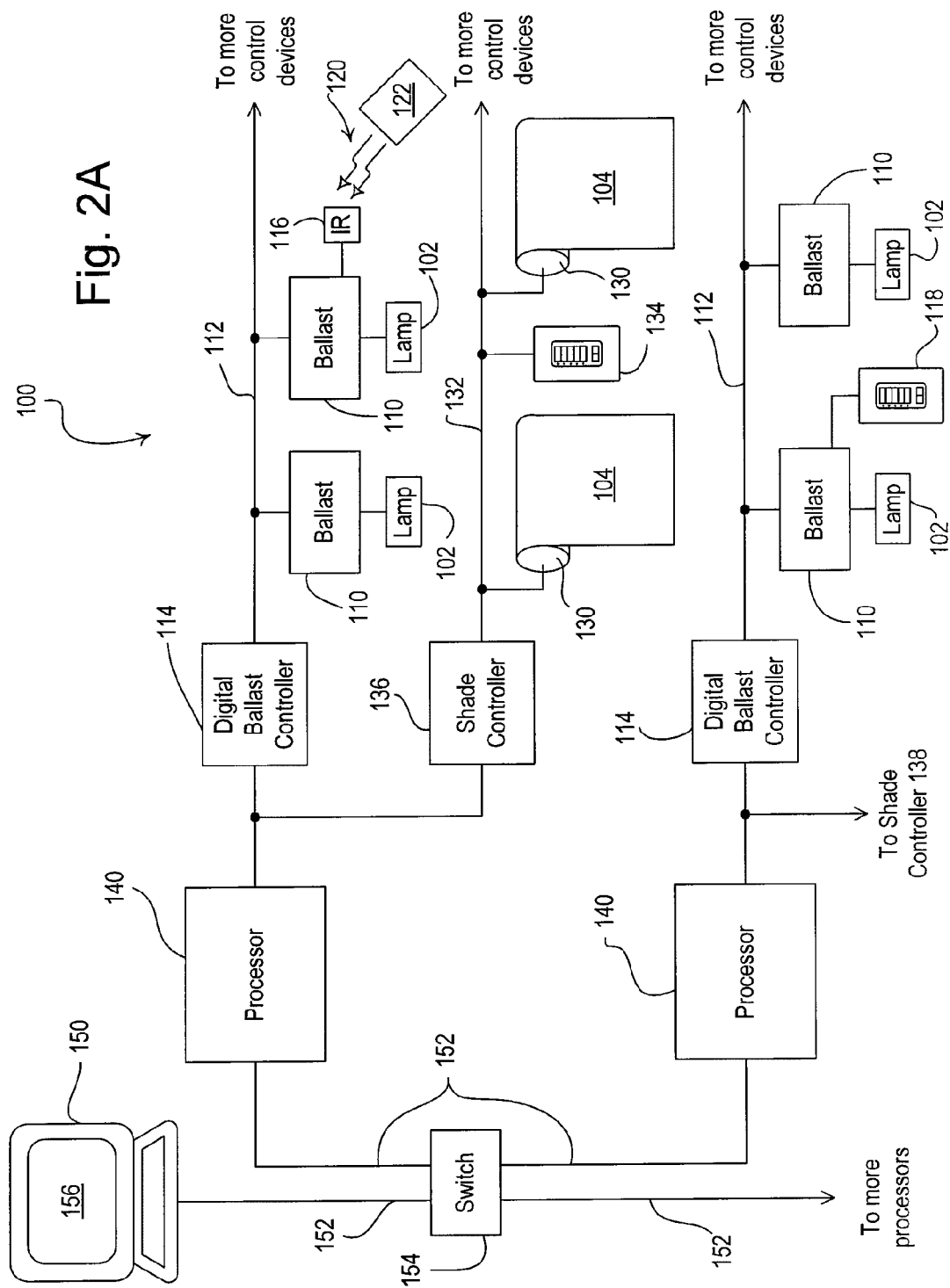
FIG. 2A is a simplified block diagram of a lighting control system of the electricity customer shown in FIG. 1.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified diagram of an electrical utility company 10 and an electricity customer 20 according to the present invention. The electricity customer 20 comprises a load control system, such as a lighting control system 100, and an internal system server 105, i.e., a personal computer (PC), while the electrical utility company 10 comprises a power generation plant 30 and an external utility server 35, i.e., a PC. The power generation plant 30 is able to provide power to the lighting control system 100 via a substation 40, electrical power lines 42, and a transformer 44.

The utility server 35 of the electrical utility company 10 and the system server 105 of the lighting control system 100 are both coupled to a network 50, e.g., the Internet, using standard network devices (i.e., Ethernet switches, routers, firewalls, etc.), which are designed to permit web browsers to connect to the World Wide Web. The utility server 35 and the system server 105 are operable to communicate with each other via the Internet using a process similar to instant messaging. Further, the lighting control system 100 is operable to shed loads (i.e., to change a load shed state) in response to information received from the electrical utility company 10.

According to the present invention, the system server 105 of the electricity customer 20 periodically connects to the utility server 35 of the electrical utility company 10 using a standard computer protocol, such as Hypertext Transfer Protocol (HTTP). When connecting to the utility server 35 of the electrical utility company 10, the system server 105 of the electricity customer 20 sends a command request message to the utility server. The command request message includes data regarding the total power requirement of all electrical devices of the electricity customer 20 (including the lighting control system 100), the present (or estimated) power consumption of the electricity customer 20 (i.e., the total amount of power presently being consumed by the electricity customer 20), and the present load shed state. The request message travels through the routers and firewalls of the electricity customer 20 across the Internet to the utility server 35. The utility server 35 receives the request message and responds to the request message by transmitting a response message to the system server 105. The response message preferably includes a command for controlling the electrical loads of the lighting control system 100 (e.g., a load shed command). Since the system server 105 transmits the initial request message to the electrical utility company 10, the routers and firewalls of the electricity customer 20 will allow the response to the request message through without compromising network security.

This procedure enables the electricity customer 20 to communicate with the electrical utility company 10 (in order to implement a load shedding process) without incurring significant expenses for network security equipment or having to worry about computer security issues. The procedure also allows the electrical utility company 10 to monitor the present power consumption of the electricity customer 20, and provides nearly real-time feedback of the load shed commands.

For purposes of demonstration, the method of the present invention is described herein with the electricity customer 20 connecting to the utility company 10 using HTTP. However, the method of the present invention could alternatively be implemented with Transmission Control Protocol (TCP) "sockets" as well. In order to establish a network connection with the utility server 35, the system server 105 would send a TCP connection request message to the utility server on a specified port (e.g., port 6600). The utility company server 35 would respond with an acknowledgement. The system server 105 would then send a TCP packet with the appropriate data values, i.e., the total power requirement, the present power consumption, and the present load shed state of the electricity customer 20. The utility server 35 would respond with a load shed command message. The system server 105 would then drop the TCP connection.

FIG. 2A is a simplified block diagram of a lighting control system 100 according to the present invention. Preferably, the lighting control system 100 is operable to control the level of illumination in a space by controlling the intensity level of the electrical lights in the space and the daylight entering the space. As shown in FIG. 2A, the lighting control system 100 is operable to control the amount of power delivered to (and thus the intensity of) a plurality of lighting loads, e.g., a plurality of fluorescent lamps 102, using a plurality of digital electronic dimming ballast 110. Further, the lighting control system 100 may additionally include a plurality of other load control devices (not shown), such as dimmers or motor speed control modules, which include appropriate load control circuits that are well known to one having ordinary skill in the art. The lighting control system 100 is further operable to control the position of a plurality of motorized window treatments, e.g., motorized roller shades 104, to control the amount of daylight entering the space.

Each of the fluorescent lamps 102 is coupled to one of the digital electronic dimming ballasts 110 for control of the intensities of the lamps. The ballasts 110 are operable to communicate with each other via digital ballast communication links 112, e.g., digital addressable lighting interface (DALI) communication links. The digital ballast communication links 112 are also coupled to digital ballast controllers (DBCs) 114, which provide the necessary direct-current (DC) voltage to power the communication links 112, as well as assisting in the programming of the lighting control system 100. Each of the ballasts 110 is operable to receive inputs from a plurality of sources, for example, an occupancy sensor (not shown), a daylight sensor (not shown), an infrared (IR) receiver 116, or a wallstation 118. The ballasts 110 are operable to transmit digital messages to the other ballasts 110 in response to the inputs received from the various sources. Preferably, up to 64 ballasts 110 are operable to be coupled to a single digital ballast communication link 112.

The ballasts 110 may receive IR signals 120 from a handheld remote control 122, e.g., a personal digital assistant (PDA), via the IR receiver 116. The remote control 122 is operable to configure the ballast 110 by transmitting configuration information to the ballasts via the IR signals 120. Accordingly, a user of the remote control 122 is operable to configure the operation of the ballasts 110. For example, the user may group a plurality of ballasts into a single group, which may be responsive to a command from the occupancy sensor. Preferably, a portion of the programming information (i.e., a portion of a programming database) is stored in memory of each of the ballasts 110. An example of the method of using a handheld remote control to configure the ballasts 110 is described in greater detail in co-pending commonly-assigned U.S. patent application Ser. No. 11/375,462, filed Mar. 13, 2006, entitled HANDHELD PROGRAMMER FOR LIGHTING CONTROL SYSTEM, the entire disclosure of which is hereby incorporated by reference.

Each of the motorized roller shades 104 comprises an electronic drive unit (EDU) 130. Each electronic drive unit 130 is preferably located inside the roller tube of the associated roller shade 104. The electronic drive units 130 are responsive to digital messages received from a wallstation 134 via a shade communication link 132. The user is operable to open or close the motorized roller shades 104, adjust the position of the shade fabric of the roller shades, or set the roller shades to preset shade positions using the wallstation 134. The user is also able to configure the operation of the motorized roller shades 104 using the wallstations 134. Preferably, up to 96 electronic drive units 130 and wallstations 134 are operable to be coupled to the shade communication link 132. A shade controller (SC) 136 is coupled to the shade communication link 132. An example of a motorized window treatment control system is described in greater detail in commonly-assigned U.S. Pat. No. 6,983,783, issued Jan. 10, 2006, entitled MOTORIZED SHADE CONTROL SYSTEM, the entire disclosure of which is hereby incorporated by reference.

A plurality of processors 140 allow for communication between the system server 105 and the load control devices, i.e., the ballasts 110 and the electronic drive units 130. Each processor 136 is operable to be coupled to one of the digital ballast controllers 114, which is coupled to the ballasts 110 on one of the digital ballast communication links 112. Each processor 140 is further operable to be coupled to the shade controller 136, which is coupled to the motorized roller shades 114 on one of the shade communication links 114. The processors 140 and the system server 105 are coupled to an inter-processor link 152, e.g., an Ethernet link, such that the system server 105 is operable to transmit digital messages to the processors 140 via a standard Ethernet switch 154.

The system server 105 executes a graphical user interface (GUI) software, which is displayed on a display screen 156 of the system server. The GUI allows the user to configure and monitor the operation of the lighting control system 100. During configuration of the lighting control system 100, the user is operable to determine the quantity of ballasts 110, digital ballast controllers 114, electronic drive units 130, shade controllers 136, and processors 140 that are connected and active using the GUI software. Further, the user may also assign one or more of the ballasts 110 to a zone or a group, such that the ballasts 110 in the group respond together to, for example, an actuation of the wallstation 118. The system server 105 is operable to transmit an alert to the user in response to a fault condition, such a fluorescent lamp that is burnt out. Specifically, the system server 105 sends an email, prints an alert page on a printer, or displays an alert screen on the screen 156.

Figure 2B:
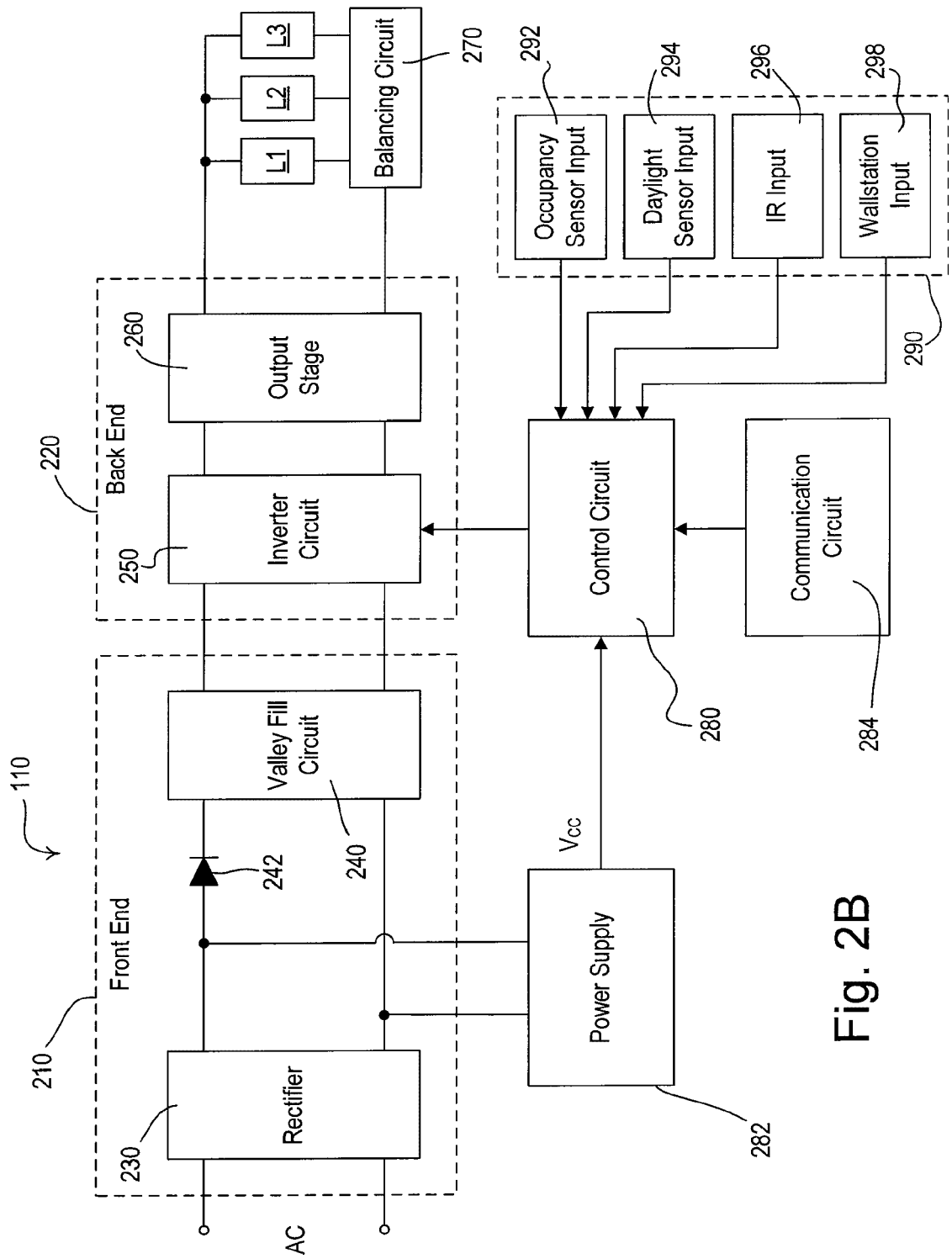
FIG. 2B is a simplified block diagram of a digital electronic dimming ballast of the lighting control system of FIG. 2A.

FIG. 2B is a simplified block diagram of one of the digital electronic dimming ballasts 110. As shown in FIG. 2B, the ballast 110 is driving three fluorescent lamps L1, L2, L3 in parallel. Electronic ballasts typically can be analyzed as comprising a front end 210 and a back end 220. The front end 210 typically includes a rectifier 230 for generating a rectified voltage from an alternating-current (AC) mains line voltage, and a filter circuit, for example, a valley-fill circuit 240, for filtering the rectified voltage to produce a direct-current (DC) bus voltage. The valley-fill circuit 240 is coupled to the rectifier 230 through a diode 242 and includes one or more energy storage devices that selectively charge and discharge so as to fill the valleys between successive rectified voltage peaks to produce a DC bus voltage. The DC bus voltage is the greater of either the rectified voltage or the voltage across the energy storage devices in the valley-fill circuit 240.

The back end 220 typically includes an inverter 250 for converting the DC bus voltage to a high-frequency AC voltage and an output circuit 260 comprising a resonant tank circuit for coupling the high-frequency AC voltage to the lamp electrodes. A balancing circuit 270 is provided in series with the three lamps L1, L2, L3 to balance the currents through the lamps and to prevent any lamp from shining brighter or dimmer than the other lamps. The front end 210 and back end 220 of the ballast 110 are described in greater detail in commonly-assigned U.S. Pat. No. 6,674,248, issued Jan. 6, 2004, entitled ELECTRONIC BALLAST, the entire disclosure of which is hereby incorporated by reference.

A control circuit 280 generates drive signals to control the operation of the inverter 250 so as to provide a desired load current to the lamps L1, L2, L3. The control circuit 280 is operable to control the intensity of the lamps L1, L2, L3 from a low-end trim (i.e., a minimum intensity) to a high-end trim (i.e., a maximum intensity). A power supply 282 is connected across the outputs of the rectifier 230 to provide a DC supply voltage, $V_{CC}$, which is used to power the control circuit 280. A communication circuit 284 is coupled to the control circuit 280 and allows the control circuit 280 to communicate with other ballasts 110 on the digital ballast communication link 112. The ballast 110 further comprises a plurality of inputs 290 having an occupancy sensor input 292, a daylight sensor 294, an IR input 296, and a wallstation 298 input. The control circuit 280 is coupled to the plurality of inputs 290 such that the control circuit 280 is responsive to the occupancy sensor, the daylight sensor, the IR receiver 116, and the wallstation 118 of the lighting control system 100.

An example of a digital electronic dimming ballast operable to be coupled to a communication link and a plurality of other input sources is described in greater detail in co-pending commonly-assigned U.S. patent application Ser. No. 10/824,248, filed Apr. 14, 2004, entitled MULTIPLE-INPUT ELECTRONIC BALLAST WITH PROCESSOR, and U.S. patent application Ser. No. 11/011,933, filed Dec. 14, 2004, entitled DISTRIBUTED INTELLIGENCE BALLAST SYSTEM AND EXTENDED LIGHTING CONTROL PROTOCOL. The entire disclosures of both applications are hereby incorporated by reference.

During normal operation of the lighting control system 100, the system server 105 communicates with the ballasts 110 and the electronic drive units 130 using a polling technique. The system server 105 polls the load control devices by transmitting a polling message to each of the ballasts 110 and electronic drive units 130 in turn. To send a polling message to a specific ballast 110, the system server 105 transmits the polling message to the processors 140. If a processor 140 that receives the polling message is coupled to the digital ballast controller 114 that is connected to the specific ballast 110, the processor 140 re-transmits the polling message to the digital ballast controller 114. Upon receipt of the polling message, the digital ballast controller 114 simply re-transmits the polling message to the specific ballast 110.

In response to receiving the polling message, the specific ballast 110 transmits a status message to the system server 105. The status message is transmitted in a relaying fashion back to the system server 105, i.e., in a reverse order than how the polling message is transmitted from the system server 105 to the ballast 110. Preferably, the status message includes the present intensity of the fluorescent lamp. For example, the ballast 110 may transmit the present intensity as a number between 0 and 127 corresponding to the percentage between off (i.e., a number of 0) and the high-end value (i.e., a number of 127).

The system server 105 is operable to determine a total power consumption of the lighting control system 100 in response to the number, wattage, and type of lamps 102 connected to the ballasts 110 and the present intensities of the ballasts. Preferably, the PC 150 estimates the total power consumption of the lighting control system 100 using one or more operational characteristics of the ballasts 110 rather than using power meters or current transformers to measure the actual input current of the ballasts. Alternatively, a single ballast 110 could be operable to estimate the power consumption of the ballast rather than the PC 150 performing the computation.

The system server 105 is operable to determine the power presently being consumed by each of the ballasts 110 by using the present intensity of each ballast and one of a plurality of ballast power consumption tables 300. A unique ballast power consumption table 300 (i.e., a look-up table) for each type of ballast is stored in the memory of the PC 150. An example of the format of the ballast power consumption tables 300 is shown in FIG. 3. The table 300 comprises a first column 310 of intensity levels (i.e., index values), which correspond to the lighting intensity levels received by the system server 105 from the ballasts 110, i.e., numbers from 0 to 127. The table 300 also comprises a second column 312 of corresponding power consumption amounts for each of the intensity levels of the first column 310, i.e., P0 through P127 as shown in FIG. 3. The values of the power consumption of the ballast 110 may range, for example, from 14.8 W at low-end to 65 W at high-end for a 277V 10% dimming ballast operating two T5 HE fluorescent lamps in parallel. Preferably, the plurality of ballast power consumption tables 300 are determined by actually measuring the current drawn by the different types of ballasts at different operating voltages under different operating conditions. The data for the plurality of ballast power consumption tables 300 is then stored in the memory of the system server 105.

The system server 105 determines the power consumption of each ballast by locating the power consumption amount in the second column 312 of the table 300 adjacent the intensity value (that was received from the ballast 110) in the first column 310. For example, if the system server 105 receives an intensity level of three (3) from the ballast 110, the system server 105 looks in the table 300 to estimate that the ballast is presently consuming an amount of power of P3. Once the system server 105 has determined the power consumption of each of the ballasts 110 in the lighting control system 100, the system server sums the power consumption values to determine a total power consumption of the lighting control system 100. Preferably, the system server 105 is operable to display the total estimated power consumption of the lighting control system 100 on the screen 156 of the system server. Alternatively, each ballast 110 could store the appropriate power consumption table 300 in the memory 286. Each ballast 110 could then determine the power consumption using the present intensity, and simply transmit the present power consumption to the PC 150.

Figure 4:
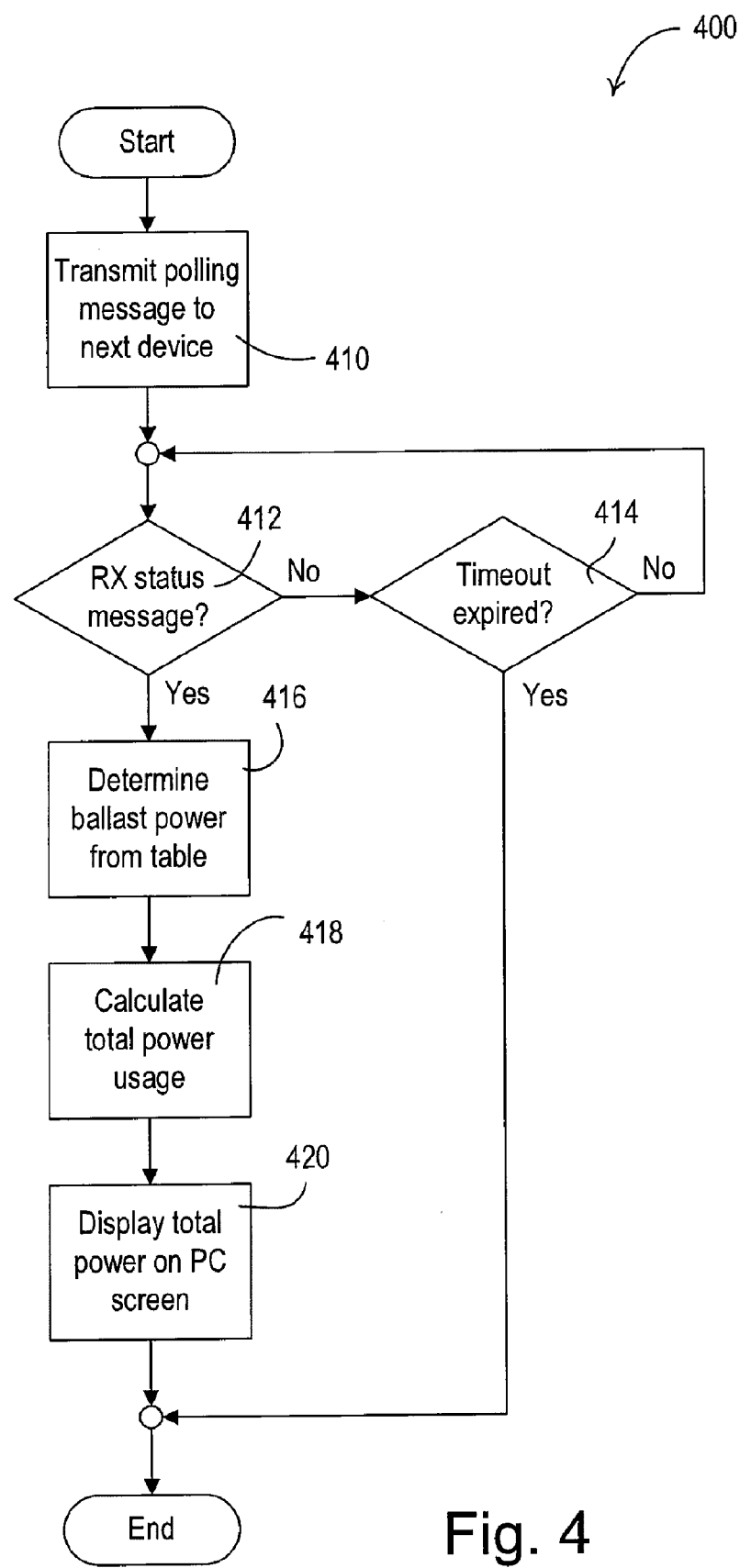
FIG. 4 is a flowchart of the power determination procedure executed by the system server of the electricity customer of FIG. 1.

FIG. 4 is a flowchart of the power determination procedure 400, which is preferably executed periodically by the system server 105. First, the system server 105 transmits a polling message to the next device to be polled, i.e., the next ballast 110, at step 410. Preferably, the system server 105 starts with the first ballast 110 and steps through each ballast 110 as the power determination procedure 400 repeats. Next, the procedure 400 loops until the system server 105 receives a status message back from the polled ballast 110 at step 412 or a timeout expires at step 414. If the timeout expires at step 414 before the system server 105 receives a status message at step 412, the system server 105 transmits a polling message to the next ballast 110 at step 410.

If the system server 105 receives a status message back from the polled ballast 110 at step 412, the system server determines the present power consumption of the polled ballast 110 using the intensity level from the status message and the appropriate ballast power consumption table 300 at step 416. The system server 105 determines which of the plurality of ballast power consumption tables 300 that are stored in memory by using the information about the ballast 110 (i.e., the type of the ballast, the wattage, number of lamps, etc.). This information about the ballast 110 may be determined by an auto-discovery procedure, which is described in greater detail in U.S. Provisional Application 60/851,383, filed Oct. 13, 2006, entitled LIGHTING CONTROL SYSTEM, the entire disclosure of which is hereby incorporated by reference. At step 418, the system server 105 determines the total power consumption by summing the present power consumption of the each of the individual ballasts 110. At step 420, the system server 105 displays the total power consumption from step 418 on the screen 156 and the procedure 400 exits.

According to the present invention, the system server 105 is operable to use the total power consumption as part of a load shedding procedure (shown in FIGS. 5-8). The system server 105 periodically connects to the utility server 35 to transmit a request message using a first load shedding procedure 500. Upon receipt of the request message, the utility server 35 processes the request message and responds by transmitting a response message to the system server 105 using a second load shedding procedure 600. The response message includes a new (or present) load shed command, which is determined by the utility server 35 by using a third load shedding procedure 700. When the system server 105 receives the response message, the system server 105 controls the lighting loads of the lighting control system 100 in accordance with the received load shed command using a fourth load shedding procedure 800.

Figure 5:
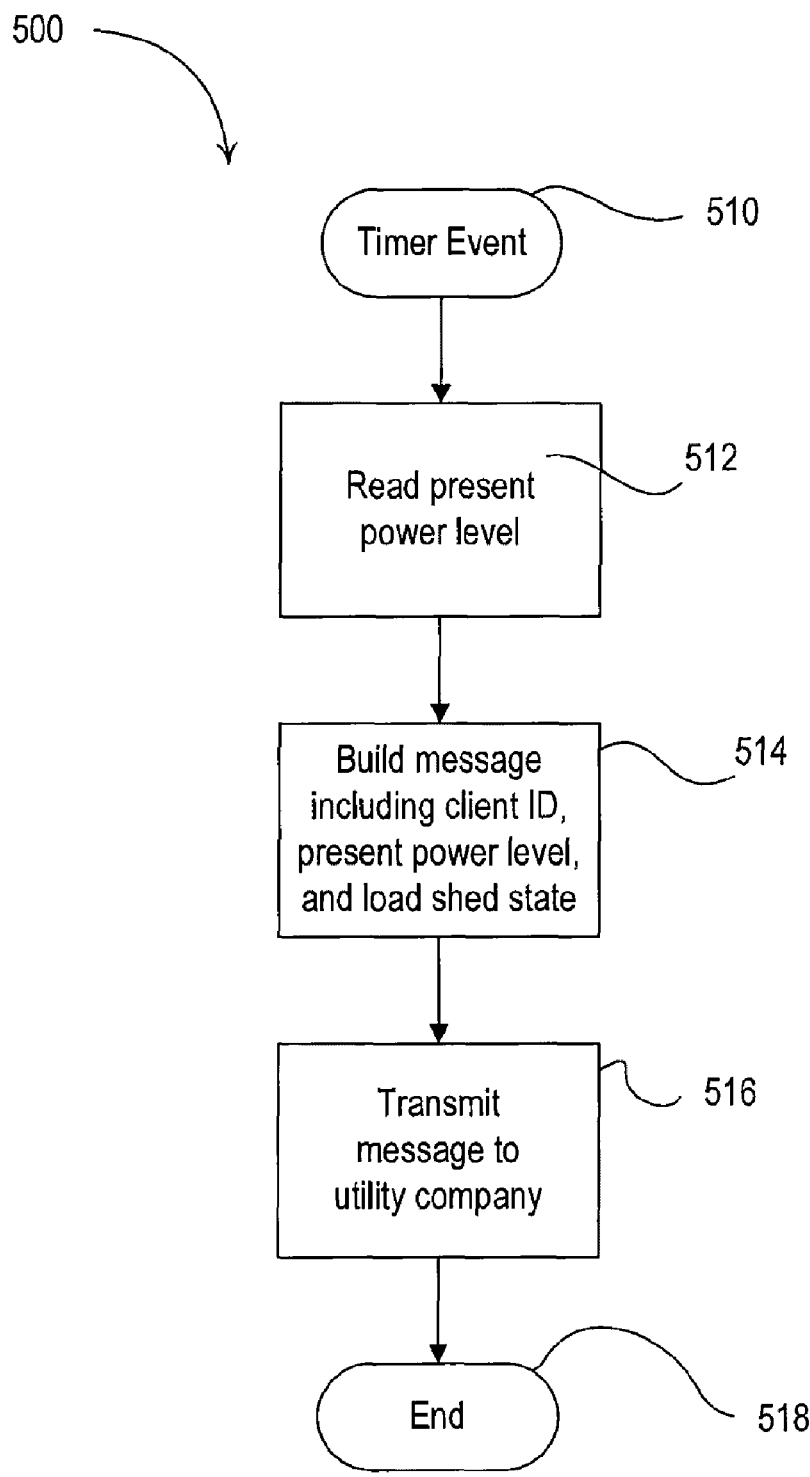
FIG. 5 is a flowchart of a first load shedding procedure executed by the system server of the electricity customer of FIG. 1.

FIG. 5 is a flowchart of the first load shedding procedure 500 executed by the system server 105 periodically, e.g., every six seconds in response to a timer event, at step 510. At step 512, the system server 105 determines the present power level, i.e., the present power consumption of the lighting control system 100 as determined by the power determination procedure 400 of FIG. 4. At step 514, the system server 105 builds the request message, which includes a unique client ID number, the present power level (of step 512), and the present load shed state. The system server 105 transmits the request message to the electrical utility company 10 at step 516 and the first load shedding procedure 500 exits at step 518.

Figure 6:
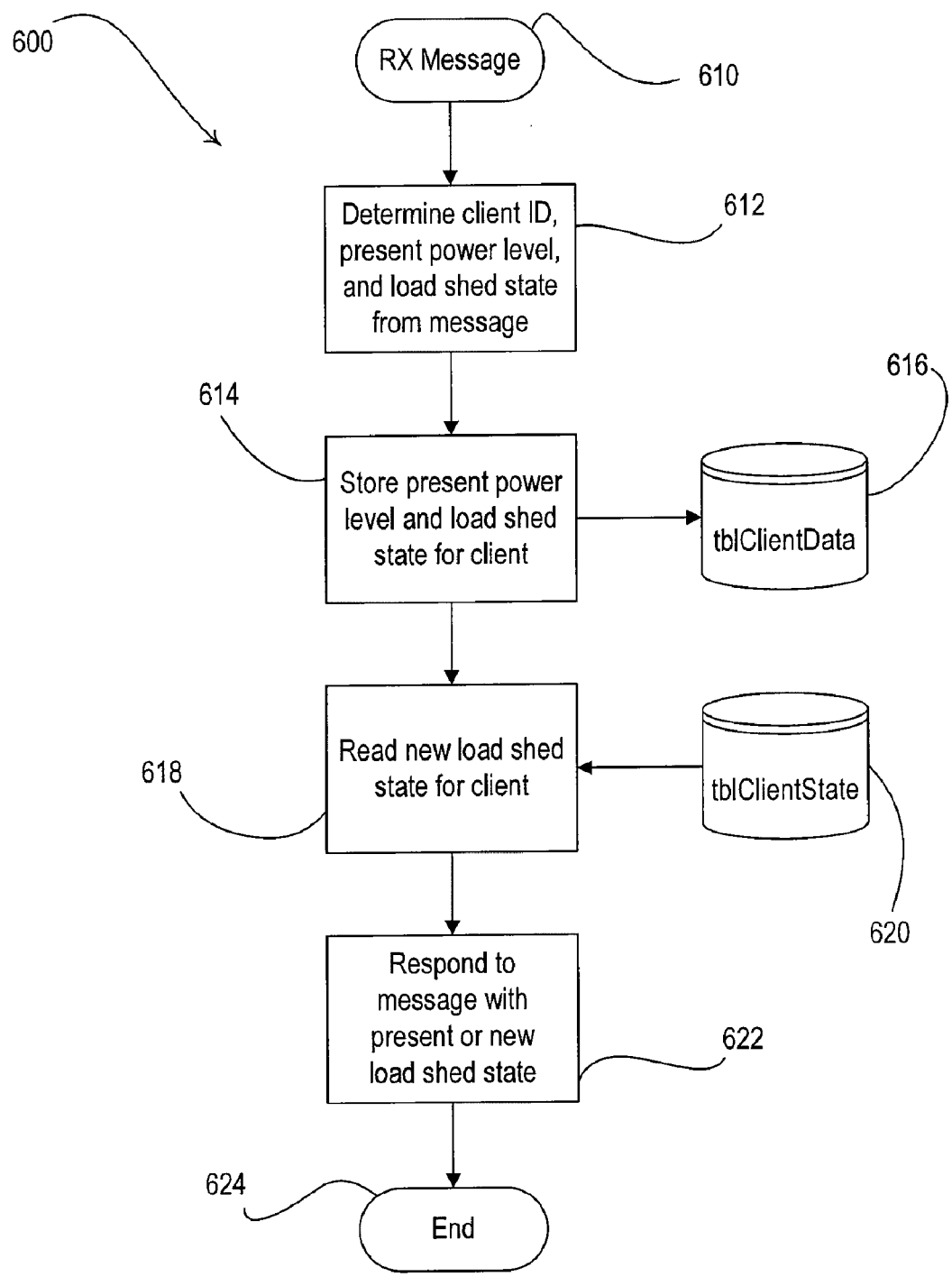
FIG. 6 is a flowchart of a second load shedding procedure executed by a utility server of the electrical utility company of FIG. 1.

FIG. 6 is a flowchart of the second load shedding procedure 600 executed by the utility server 35 in response to receiving the request message at step 610. First, the utility server 35 determines the client ID number, the present power level, and the present load shed state from the request message at step 612. At step 614, the utility server 35 stores the present power level and the present load shed state from the received message in a first database 616 ("tblClientData"). At step 616, the utility server 35 reads a new load shed state for the customer 20 from a second database 620 ("tblClientState"). Finally, the utility server 35 responds to the request message by transmitting the response message (including the new load shed state) to the customer 20 at step 622 and the procedure 600 exits at step 624.

Figure 7:
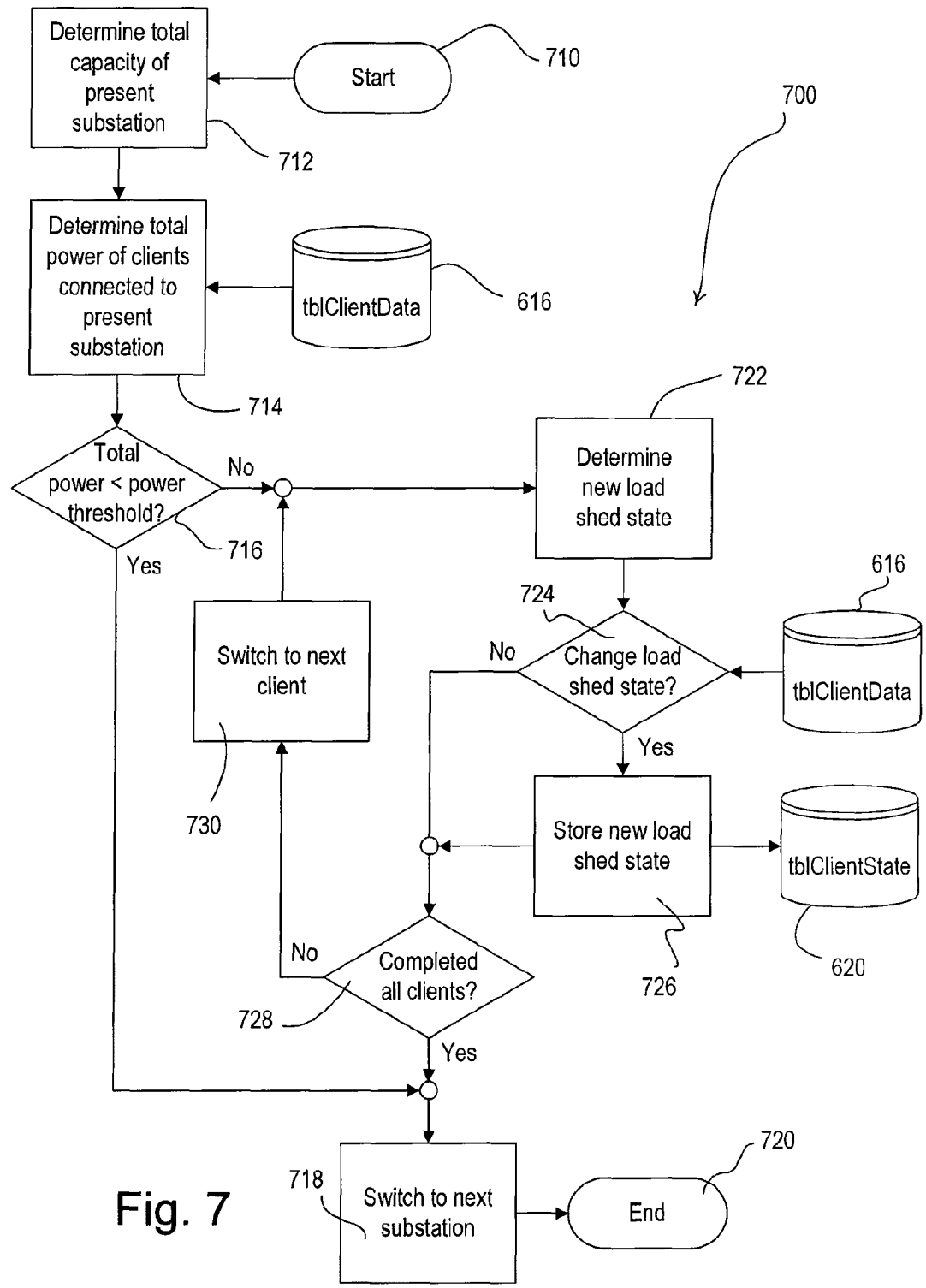
FIG. 7 is a flowchart of a third load shedding procedure executed by the utility server of the electrical utility company of FIG. 1.

The data of the second database 620 is determined by utility server 35 from the data in the first database 616 using the third load shedding procedure 700 shown in FIG. 7. The third load shedding procedure 700 preferably runs periodically, e.g., as part of a main control loop of the utility server 35, and begins at step 710. As described in the present invention, the utility server 35 monitors the total power output of each of the substations 40 to ensure that no substations are overloaded. Accordingly, the utility server 35 initiates load shed commands by comparing the total power output of each of the substations to a predetermined power threshold for each substation 40. Each time the third load shedding procedure 700 executes, the utility server 35 evaluates a different substation 40. Alternatively, the utility server 35 could use a different algorithm for determining when and what load shed commands to transmit.

At step 712, the utility server 35 determines the total capacity of the present substation 40, e.g., by reading the value from memory. At step 714, the utility server 35 determines the total power output of the present substation 40 by summing the power consumptions (from the first database 616) of each of the load control systems powered to the present substation (i.e., a subset of all of the customers of the electrical utility company 10). If the total power output of the present substation 40 is less than the predetermined power threshold for the present substation, the utility server 35 simply switches to the next substation at step 718 and the procedure 700 exits at step 720

However, if the total power output of the present substation 40 exceeds the predetermined power threshold of the present substation, the utility server 35 steps through each of the customers 20 (i.e., clients) connected to the present substation and determines whether to issue a new load shed command for each of the customers. Specifically, the utility server 35 determines the desired new load shed state for the present customer 20 at step 722. If there is a change in the load shed state for the present customer 20 (i.e., as compared to the present load shed state in the first database 616) at step 724, the utility server 35 stores the new load shed state in the second database 620 at step 726. Otherwise, the utility server 35 does not change the load shed state of the present customer 20. If there are more customers connected to the present substation at step 728, the utility server 35 switches to the next customer at step 730 and then determines whether to change the load shed state for the next customer (i.e., at steps 722, 724, 726). If there are not more customers to analyze at step 728, the utility server 35 switches to the next substation at step 718 and the procedure 700 exits at step 720.

Figure 8:
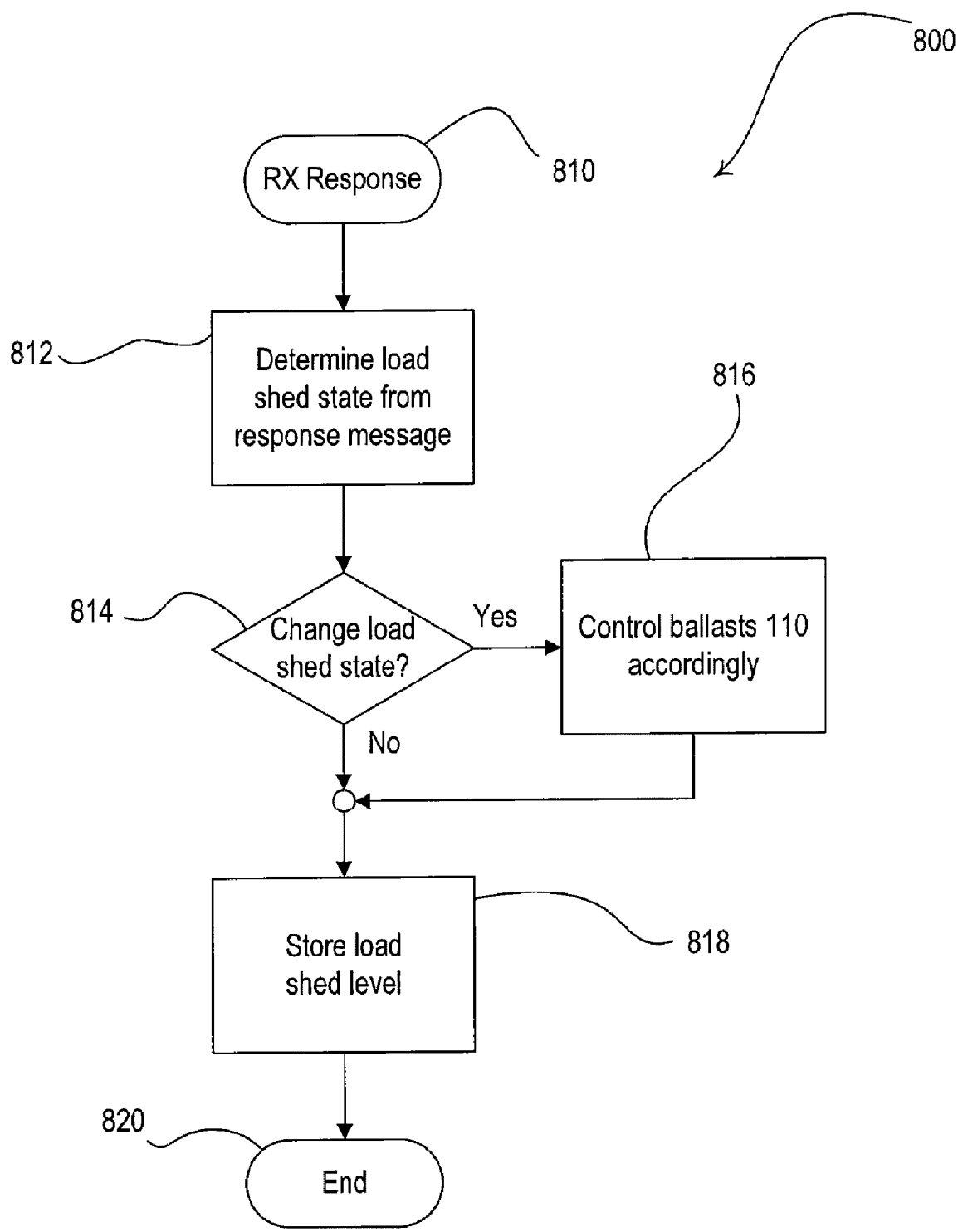
FIG. 8 is a flowchart of a fourth load shedding procedure executed by the system server of the electricity customer of FIG. 1.

FIG. 8 is a flowchart of the fourth load shedding procedure 800 executed by the system server 105 when a response to the request message is received at step 810. At step 812, the system server 105 compares the load shed state included in the response message to the present load shed state. If there has been a change in the load shed state at step 814, the system server 105 controls the ballast 110 accordingly at step 816 and logs the load shed state received in the response message at step 818 before the procedure 800 exits at step 820. If there has not been a change in the load shed state at step 814, the system server 105 simply logs the load shed state at step 818 and exits the procedure 800 at step 820.

The consequence of using the load shedding procedure according to the present invention is that the capital cost to participate, for both the electrical utility company 10 and the electricity customer 20, is extremely low. The electricity customer 20 can continue to use a very low cost DSL or cable modem, using out-of-the-box functionality, with almost no possibility of being "hacked." The electrical utility company 10 simply has to add one or more web servers to support requests along with associated database servers and other software and hardware that would be required to manage load shed in any event. The electrical utility company 10 does not have to persuade customers to change their networking equipment or offer to replace the customer's network equipment. The electrical utility company 10 does not have to replace meters, or invest in communication infrastructure along its right of way. The electrical utility company 10 does not find itself in the business of providing secure communications into the premises of each customer or incurring the legal liability if a computer hacker figures out how to exploit the system of the electrical utility company 10 to do mischief.

The present invention is described with reference to the lighting control system 100 for controlling lighting loads, i.e., fluorescent lamps 102. However, the method of communicating of the present invention may be applied to any type of electrical load, e.g., a motor load, any type of load control system, e.g., a heating, ventilation, and air conditioning (HVAC) system or an elevator system, or a system including multiple load control systems. Further, the present invention is not limited to load control systems that use an estimation of the present power consumption of an electrical load to determine the total amount of power presently being consumed by the load control system. For example, power meters may be used to measure the actual power being consumed by the load control system.

Figure 9:
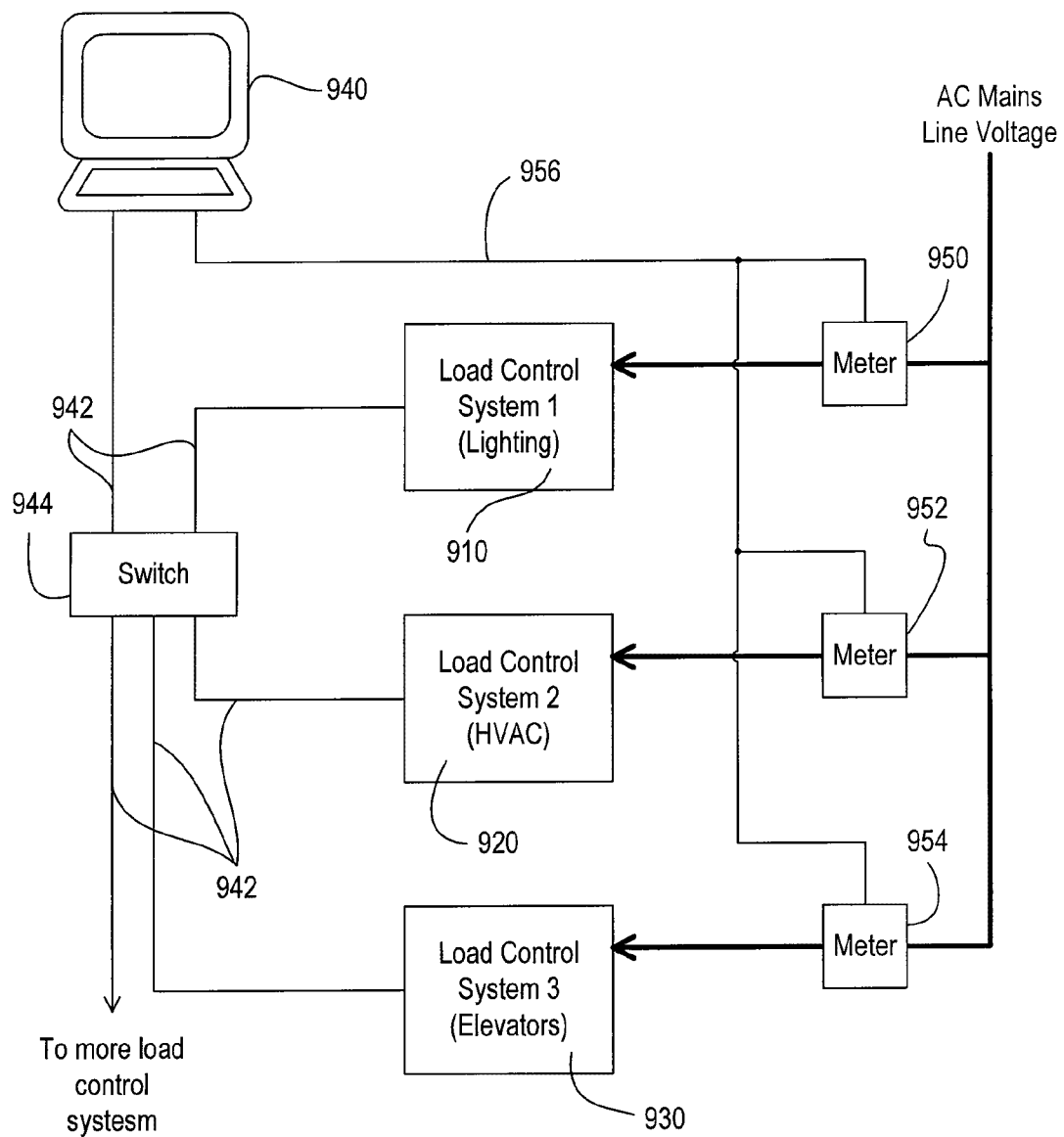
FIG. 9 is a simplified block diagram of a building control system comprising multiple individual load control systems and power meters to measure the actual power consumption of each of the load control systems.

FIG. 9 is a simplified block diagram of a building control system 900 comprising a first load control system 910 (e.g., a lighting control system), a second load control system 920 (e.g., an HVAC system), and a third load control system 930 (e.g., an elevator control system). Each of the load control systems 910, 920, 930 is coupled to a system server 940 via an Ethernet link 942 and an Ethernet switch 944. Each of the load control systems 910, 920, 930 includes one or more individual electrical loads, and a system controller, such as a processor, that is coupled to the Ethernet link 942 to communicate with the system server 940. The system server 940 is operable to be coupled to the Internet to receive load shed commands to thus control the various load control systems 910, 920, 930 according to the method of the present invention.

Each of the load control systems 910, 920, 930 also receives the AC mains line voltage for powering the individual electrical loads of the load control systems. Power meter 950, 952, 954 (e.g., current transformers) are coupled in series with the AC mains feed for each of the load control systems 910, 920, 930, respectively. The power meters 950, 952, 954 are operable to measure the actual current being drawn by each of the load control systems 910, 920, 930 to thus determine the actual power presently being consumed by each of the load control system as is well known to one of ordinary skill in the art. The power meters 950, 952, 954 are coupled to the system server 940 via a meter control link 956 (e.g., an RS-485 communication link), and are operable to report the measured current or power consumption to the system server, which can determine the total power being consumed by the building control system 900. Alternatively, the load control systems 910, 920, 930 could include multiple power meters operable to measure the power presently being consumed by a subset of the electrical loads of the load control system. For example, the lighting control system 910 could include a power meter coupled to different lighting circuits (e.g., lighting circuits of different tenants of an office building) to determine the power consumption of different subsets of lighting loads.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of communicating a command for controlling a plurality of electrical loads, the method comprising the steps of:

transmitting a command request message;

receiving a response message in response to the command request message, the response message including the command; and controlling the plurality of electrical loads in response to the command of the response message.

2. The method of claim 1, wherein the command request message comprises a total amount of power presently being consumed by the plurality of electrical loads.

3. The method of claim 2, further comprising the steps of:
determining a present amount of power being consumed by each of the plurality of electrical loads; and
determining the total amount of power presently being consumed by the plurality of electrical loads in response to the step of determining a present amount of power being consumed by each of the plurality of electrical loads.

4. The method of claim 3, wherein the step of determining the total amount of power presently being consumed by all of the plurality of electrical loads further comprises summing the present amounts of power being consumed by the plurality of electrical loads.

5. The method of claim 3, wherein the step of determining a present amount of power being consumed by each of the plurality of electrical loads further comprises estimating the present amount of power being consumed by each of the plurality of electrical loads.

6. The method of claim 3, wherein the step of determining a present amount of power being consumed by each of the plurality of electrical loads further comprises measuring the present amount of power being consumed by each of the plurality of electrical loads.

7. The method of claim 2, wherein the command of the response message comprises a load shed command.

8. The method of claim 7, further comprising the step of:
determining the load shed command in response to the total amount of power presently being consumed by the plurality of electrical loads of the command request message.

9. A computer-readable medium having stored thereon computer-executable instructions for performing a method of communicating a command to control a plurality of electrical loads, the method comprising the steps of:
transmitting a command request message;
receiving a response message in response to the command request message, the response message including the command; and
controlling the plurality of electrical loads in response to the command of the response message.

* * * * *